(12) United States Patent
Domeyer et al.

(10) Patent No.: US 11,414,102 B2
(45) Date of Patent: Aug. 16, 2022

(54) SYSTEMS AND METHODS FOR VEHICLE COMMUNICATION CONSISTENCY

(71) Applicant: Toyota Motor Engineering & Manufacturing North America, Inc., Plano, TX (US)

(72) Inventors: Joshua E. Domeyer, Madison, WI (US); Benjamin P. Austin, Saline, MI (US); John K. Lenneman, Okemos, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 232 days.

(21) Appl. No.: 16/774,205

(22) Filed: Jan. 28, 2020

(65) Prior Publication Data
US 2021/0229703 A1    Jul. 29, 2021

(51) Int. Cl.
| | | |
|---|---|---|
| *B60W 60/00* | (2020.01) | |
| *G05D 1/02* | (2020.01) | |
| *B60W 50/14* | (2020.01) | |
| *B60W 30/095* | (2012.01) | |
| *G08G 1/16* | (2006.01) | |

(Continued)

(52) U.S. Cl.
CPC .... *B60W 60/0017* (2020.02); *B60W 30/0956* (2013.01); *B60W 50/14* (2013.01); *G05D 1/0212* (2013.01); *G05D 1/0276* (2013.01); *G08G 1/166* (2013.01); *B60Q 1/04* (2013.01); *B60Q 1/503* (2013.01); *B60Q 5/00* (2013.01); *B60W 2050/0075* (2013.01); *B60W 2420/54* (2013.01); *B60W 2540/21* (2020.02); *B60W 2540/223* (2020.02); *B60W 2540/225* (2020.02); *B60W 2554/20* (2020.02); *B60W 2554/4029* (2020.02); *B60W 2555/20* (2020.02); *B60W 2556/45* (2020.02); *G05D 2201/0213* (2013.01)

(58) Field of Classification Search
CPC ...... B60W 50/10; B60W 50/14; B60W 30/09; B60W 30/095
See application file for complete search history.

(56) References Cited

U.S. PATENT DOCUMENTS

| | | |
|---|---|---|
| 8,630,768 B2 | 1/2014 | McClellan et al. |
| 9,196,164 B1 | 11/2015 | Urmson et al. |

(Continued)

*Primary Examiner* — Sze-Hon Kong
*Assistant Examiner* — Mikko Okechukwu Obioha
(74) *Attorney, Agent, or Firm* — Christopher G. Darrow; Darrow Mustafa PC

(57) ABSTRACT

System, methods, and other embodiments described herein relate to addressing inconsistencies between a trajectory plan and a communication from an occupant of an autonomously operated vehicle. A method of resolving inconsistent communication includes obtaining a trajectory plan for the vehicle, detecting, using one or more internal sensors, body language of the occupant, analyzing sensor data from the one or more internal sensors to determine a verbal or non-verbal communication indication by the occupant, and detecting an inconsistency between the verbal or non-verbal communication indication and the trajectory plan and: 1) modifying the trajectory plan to form a modified trajectory plan aligned with the verbal or non-verbal communication indication, or 2) transmitting a notification to the occupant prompting the occupant to adjust the verbal or non-verbal communication indication.

20 Claims, 6 Drawing Sheets

(51) Int. Cl.
*B60Q 1/04* (2006.01)
*B60Q 1/50* (2006.01)
*B60Q 5/00* (2006.01)
*B60W 50/00* (2006.01)

(56) References Cited

U.S. PATENT DOCUMENTS

| | | |
|---|---|---|
| 10,118,548 B1 | 11/2018 | Fields et al. |
| 10,196,058 B2 | 2/2019 | Paris et al. |
| 10,821,886 B1 * | 11/2020 | Breedvelt-Schouten .................... G06F 3/013 |
| 2017/0050642 A1 | 2/2017 | Heckmann et al. |
| 2017/0131719 A1 | 5/2017 | Micks et al. |
| 2018/0126986 A1 | 5/2018 | Kim et al. |
| 2018/0276986 A1 | 9/2018 | Delp |
| 2020/0198644 A1 * | 6/2020 | Hutchings ............. B60W 40/09 |
| 2020/0247434 A1 * | 8/2020 | Kim .................. G06K 9/00845 |
| 2020/0379458 A1 * | 12/2020 | Mckinney ............. B60K 28/14 |
| 2021/0064030 A1 * | 3/2021 | Jiang ................ G08G 1/096844 |
| 2021/0209922 A1 * | 7/2021 | Yang .................... B60W 40/08 |

* cited by examiner

SYSTEMS AND METHODS FOR VEHICLE COMMUNICATION CONSISTENCY

TECHNICAL FIELD

The subject matter described herein relates, in general, to systems and methods for achieving communication consistency in an autonomous vehicle, and, more particularly, to monitoring body language of an occupant of an autonomous vehicle to ensure consistency between non-verbal communication of the occupant and navigational operation of the autonomous vehicle.

BACKGROUND

As technological trends in transportation transition toward increased automation, vehicles with autonomous capabilities become more and more prevalent. During this transition, however, pedestrians, bicyclists and other drivers will continue to look to a driver or person who appears to be the driver for cues on how to negotiate close encounters with vehicles, even in the case of vehicles that are operating in an autonomous mode. For example, at a section of road that includes a crosswalk without a stop sign or traffic light, a pedestrian approaching the crosswalk at around the same time that a vehicle is arriving will look to the driver for an indication as to whether the driver has noticed the pedestrian and intends to slow down to allow the pedestrian to pass. The driver may speak, mouth words, or show a gesture, such as a nod or a wave, to indicate intent to allow the pedestrian to cross. In other cases, the driver may continue to look straight ahead without turning toward the pedestrian, i.e., body language that the pedestrian may interpret as indicating no intent to slow down. Thus, the pedestrian can take appropriate care in waiting to enter the crosswalk.

Such visual cues and verbal and non-verbal communication are currently quintessential in safely completing close encounters between pedestrians and moving vehicles. For better or worse, this type of communication exchange is so ingrained in modern cultural conduct that it can occur between parties on both sides automatically with little or no thought. Challenges arise when a passenger of an autonomously operated vehicle is seated in a driver's seat of a vehicle, riding without being in immediate control of the vehicle. A pedestrian might automatically look, incorrectly, to the passenger for an indication on how the vehicle will behave to inform the pedestrian how to safely negotiate the close encounter. This modern challenge, in fact, can arise dangerously in many different types of situations, including encounters between moving vehicles and bicyclists, motorcycles and other moving vehicles.

SUMMARY

The disclosed systems and methods relate to monitoring body language of an occupant of an autonomous operating vehicle to ensure consistency between communication (e.g., verbal or non-verbal) of the occupant and behavior of the autonomously operated vehicle. The disclosed systems and methods improve the chances of achieving safe outcomes in close encounters between autonomously operated vehicles and others that share the road with, or are within the vicinity of, the autonomously operated vehicle.

In one embodiment, an autonomously operated vehicle consistency system includes one or more internal sensors configured to detect body language of an occupant of the vehicle, one or more processors, and a memory communicably coupled to the one or more processors and storing a drive module including instructions that, when executed by the one or more processors, cause the one or more processors to obtain a trajectory plan for the vehicle. The memory also stores a monitoring module including instructions that, when executed by the one or more processors, cause the one or more processors to analyze sensor data from the one or more internal sensors to determine a verbal or non-verbal communication indication by the occupant. In addition, the memory stores a controller module including instructions that, when executed by the one or more processors, cause the one or more processors to detect an inconsistency between the verbal or non-verbal communication indication and the trajectory plan and: 1) modify the trajectory plan to form a modified trajectory plan aligned with the verbal or non-verbal communication indication, or 2) transmit a notification to the occupant prompting the occupant to adjust the verbal or non-verbal communication indication.

In another embodiment, a method of resolving inconsistent communication from an occupant of an autonomously operated vehicle includes obtaining a trajectory plan for the vehicle, detecting, using one or more internal sensors, body language of the occupant the vehicle, analyzing sensor data from the one or more internal sensors to determine a verbal or non-verbal communication indication by the occupant; and detecting an inconsistency between the verbal or non-verbal communication indication and the trajectory plan and 1) modifying the trajectory plan to form a modified trajectory plan aligned with the verbal or non-verbal communication indication, or 2) transmitting a notification to the occupant prompting the occupant to adjust the verbal or non-verbal communication indication.

In another embodiment, a non-transitory computer-readable medium for resolving inconsistent communication from an occupant of an autonomously operated vehicle includes instructions that, when executed by one or more processors, cause the one or more processors to obtain a trajectory plan for the vehicle, detect, using one or more internal sensors, body language of the occupant the vehicle, analyze sensor data from the one or more internal sensors to determine a verbal or non-verbal communication indication by the occupant, and detect an inconsistency between the verbal or non-verbal communication indication and the trajectory plan and: 1) modify the trajectory plan to form a modified trajectory plan aligned with the verbal or non-verbal communication indication, or 2) transmit a notification to the occupant prompting the occupant to adjust the verbal or non-verbal communication indication.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
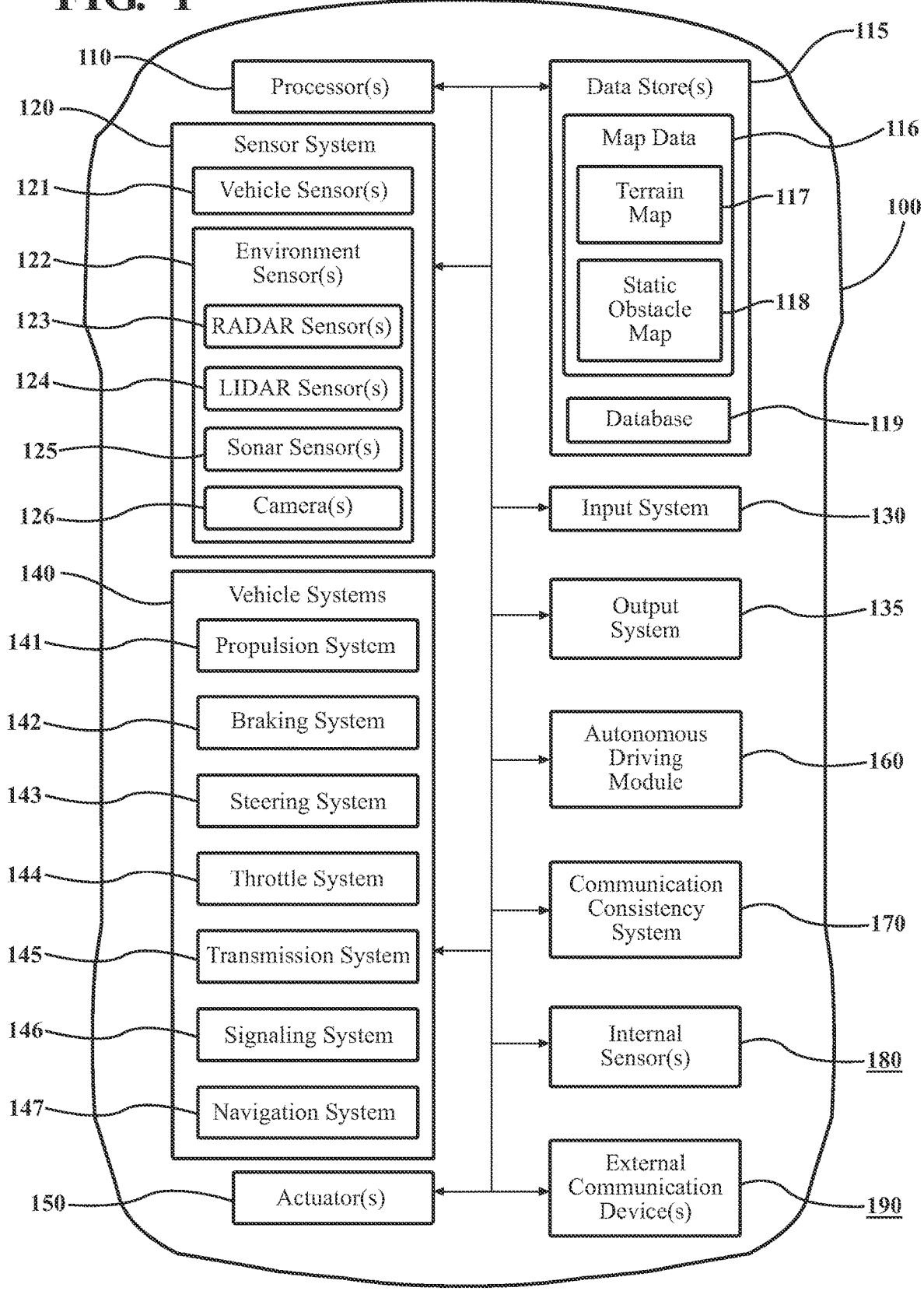
FIG. 1 illustrates one embodiment of a vehicle within which systems and methods disclosed herein may be implemented.

Systems, methods, and other embodiments associated with achieving congruence between occupant communication and vehicle behavior in an autonomous vehicle or a vehicle operating in an autonomous mode are disclosed. As mentioned previously, pedestrians, as well as bicyclists and other drivers, may automatically look to an occupant seated in the driver's seat of an autonomously operated vehicle for a visual cue regarding how to negotiate an encounter. Such encounters may commonly occur, for example, at crosswalks, intersections (particularly intersections without traffic lights), in parking lots, along narrow roads, etc. Herein, situations that commonly invoke nonverbal communication, visual cues, or even verbal communication between a driver of a vehicle and a person outside of the vehicle (e.g., pedestrian, bicyclist, other driver, etc.) in order to negotiate safe passage will be referred to generally as "communication encounters." The disclosed embodiments can improve the likelihood of safe outcomes in communication encounters between autonomously operated vehicles and others in the vicinity.

An autonomous vehicle (or vehicle operating in autonomous mode) can include a navigational system and one or more systems, such as an autonomous driving module, that determine driving maneuvers and trajectory plans for the vehicle as the vehicle travels along a route. The vehicle can further include one or more external sensors that can detect aspects of an environment through which the autonomous vehicle travels. The disclosed embodiments can, in addition to these features, include an internal monitoring system that monitors body language of one or more occupants of the vehicle.

The autonomous driving module can, based on route data from the navigational system and sensor data from the external sensors, determine or adjust an immediate trajectory plan for the vehicle depending on various circumstances that arise during travel. The autonomous driving module can, for example, constantly update the trajectory plan as additional information is received from the external sensors and/or the navigational system. For example, external sensor data may indicate that a vehicle in an adjoining lane is changing lanes ahead, which causes the autonomous driving module to modify the trajectory plan to reduce the speed of the autonomous vehicle.

When the autonomous vehicle approaches a communication encounter (e.g., a crosswalk that a pedestrian is also approaching) the autonomous driving module can determine a trajectory plan according to the available data, such as map data, sensor data, traffic data, etc. However, the occupant of the autonomous vehicle may also, intentionally or unintentionally, make a mental judgment call as to how the communication encounter should be resolved. Furthermore, intentionally or unintentionally, the occupant may reflexively perform a gesture reflecting the judgment call. This gesture would not be informed by the trajectory plan which the autonomous driving module has determined internally for the autonomous vehicle and, in fact, may be in exact opposition to the trajectory plan.

For example, referring to the crosswalk scenario, the trajectory plan may include the autonomous vehicle not yielding to the pedestrian but instead passing directly through the crosswalk. Nevertheless, unaware of the trajectory plan the occupant of the autonomous vehicle may casually glance at the pedestrian, nod, or inadvertently perform a gesture that the pedestrian interprets as indicating that the vehicle will allow the pedestrian to cross the crosswalk ahead of the vehicle.

The disclosed embodiments provide several ways to remedy inconsistencies between an autonomously created vehicle trajectory plan and an intentional or inadvertent communication from an occupant of the autonomous vehicle. In one or more embodiments, the autonomously operated vehicle can detect the inconsistency and perform one or more of: 1) modify the behavior of the vehicle to align with the communication of the occupant, 2) prompt the occupant to change or cease the inconsistent communication, and 3) communicate the planned trajectory of the vehicle to an external party (e.g., pedestrian, cyclist, other driver, etc.).

Referring to FIG. 1, an example of a vehicle 100 is illustrated. As used herein, a "vehicle" is any form of powered transport. In one or more implementations, the vehicle 100 is an automobile, e.g., a hybrid/electric automobile, an autonomous/semi-autonomous automobile, a combination thereof, etc., that is capable of operating in an autonomous mode. While arrangements will be described herein with respect to automobiles, it will be understood that embodiments are not limited to automobiles. In some implementations, the vehicle 100 may be any form of powered transport that, for example, can carry an occupant who may inadvertently communicate in a manner inconsistent with an autonomously created trajectory plan of the transport, and thus can benefit from the functionality discussed herein.

As shown in FIG. 1, the vehicle 100 includes multiple elements. It should be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2-6 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

In any case, the vehicle 100 includes a communication consistency system 170 that is implemented to perform methods and other functions as disclosed herein relating to detecting and resolving inconsistencies between a trajectory plan of the vehicle 100 and a communication of an occupant of the vehicle 100. The noted functions and methods will become more apparent in the following discussion of the figures.

Figure 2:
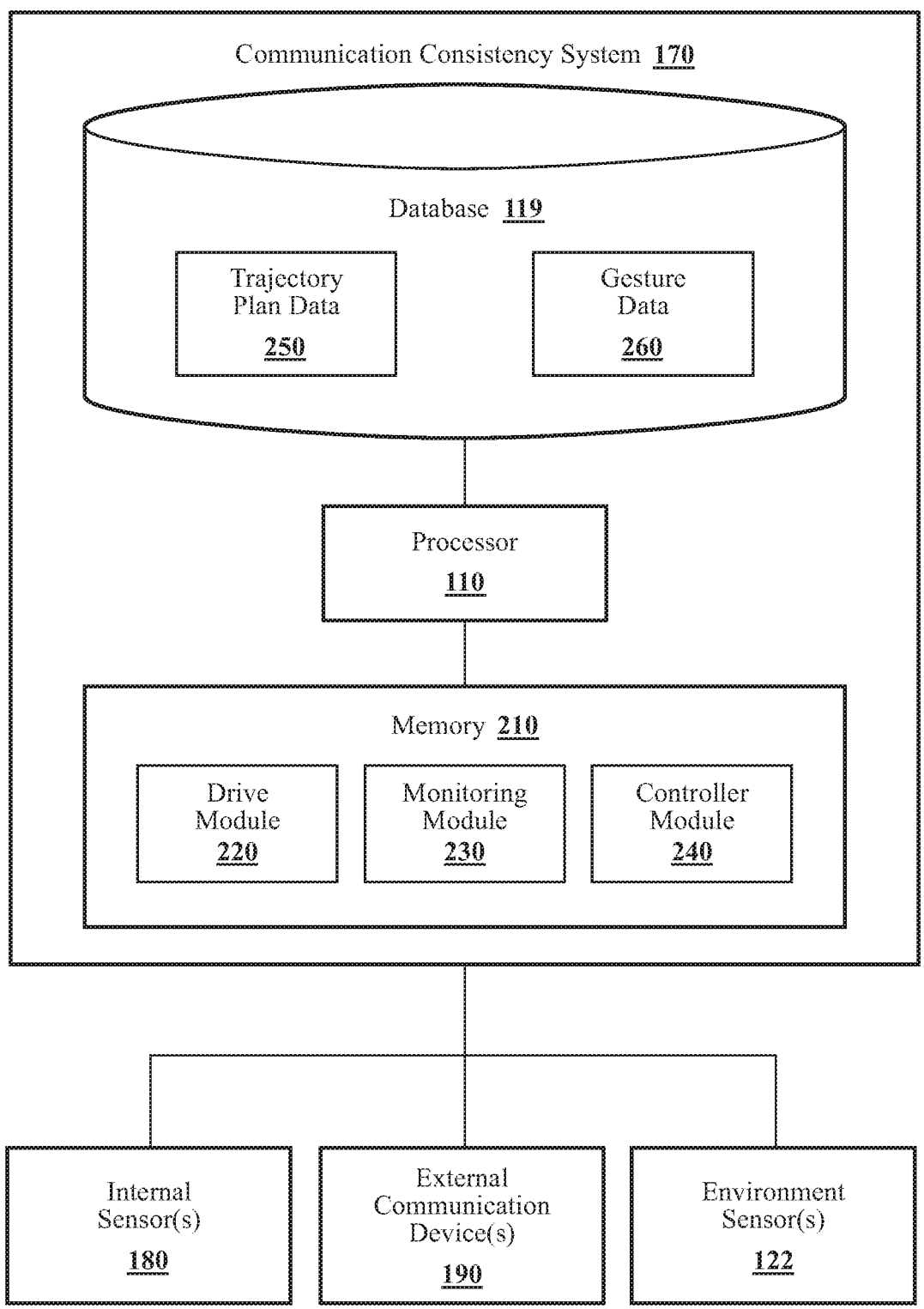
FIG. 2 illustrates one example of a communication consistency system according to the disclosed embodiments.

With reference to FIG. 2, one embodiment of the communication consistency system 170 of FIG. 1 is illustrated. The communication consistency system 170 is shown as including a processor 110 and database 119 from the vehicle 100 of FIG. 1. Accordingly, the processor 110 may be a part of the communication consistency system 170, the communication consistency system 170 may include a separate processor from the processor 110 of the vehicle 100 or the communication consistency system 170 may access the processor 110 through a data bus or another communication path.

In one or more embodiments, the communication consistency system 170 is operably connected with one or more internal sensors 180 that are configured to detect movement, position, sounds and/or body language of an occupant of the vehicle 100, one or more external communication devices 190 that can be utilized to indicate a forthcoming vehicle behavior, such as an intention to drive forward, an intention to stop, an intention to turn, etc., and one or more environment sensors 122 configured to detect one or more aspects of an environment outside of the vehicle 100.

The communication consistency system 170 includes a database 119 that stores, among other things, trajectory plan data 250 and gesture data 260, as will be discussed further below. The database 119, in one embodiment, is constructed as an electronic data structure stored in the memory 210 or another data store, such as the vehicle 100 data store 115, a cloud-based storage, a removable memory device, or another suitable location that is accessible to the modules 220, 230 and 240. The database 119 is configured with routines that can be executed by the processor 110 for analyzing stored data, providing stored data, organizing stored data, and so on. Thus, in one embodiment, the database 119 stores data described above (as well as other data) used by the modules 220, 230 and 240 in executing various functions.

Additionally, the communication consistency system 170, in one embodiment, includes a memory 210 that stores a drive module 220, a monitoring module 230 and a controller module 240. The memory 210 can be constructed as a random-access memory (RAM), read-only memory (ROM), a hard-disk drive, a flash memory, or other suitable memory for storing the modules 220, 230 and 240. The modules 220, 230 and 240 are, for example, constructed as computer-readable instructions that when executed by the processor 110 cause the processor 110 to perform the various functions disclosed herein.

The drive module 220 is generally constructed including instructions that function to control the processor 110 to obtain a trajectory plan for the vehicle 100 and store the plan as trajectory plan data 250. A trajectory plan as used herein refers to data related to controlling the aspects of the upcoming trajectory of the vehicle 100, particularly in an autonomous operation mode, for example, including speed data, brake data, steering data, navigation data, obstacle avoidance data and other types of data that can affect an upcoming trajectory of the vehicle 100. For example, trajectory plan data 250 can include data indicating the autonomous drive module 160 will maintain a current speed of 45 mph for the next 300 feet and thereafter begin to slow down for an upcoming stop sign.

The drive module 220 can obtain the trajectory plan, for example, from the autonomous driving module 160 (FIG. 1) or one or more other electronic control components of the vehicle 100. In one or more embodiments the drive module 160 can obtain or compile a most current version of a trajectory plan and continuously update the trajectory plan data 250 with the most current version of the trajectory plan.

The monitoring module 230 is constructed including instructions that function to control the processor 110 to analyze sensor data from the one or more internal sensors 180 to determine a communication indication by an occupant of the vehicle 100 (e.g., a person sitting in the driver's seat or a passenger seat of the vehicle 100). More specifically, in one or more embodiments the monitoring module 230 can determine a verbal or non-verbal communication indication exhibited by the occupant of the vehicle 100.

The controller module 240 is constructed including instructions that function to control the processor 110 to detect an inconsistency between the verbal or non-verbal communication indication and the trajectory plan and, dependent upon various parameters discussed further below: 1) modify the trajectory plan to form a modified trajectory plan that matches the verbal or non-verbal communication indication, or 2) transmit a notification to the occupant prompting the occupant to adjust the verbal or non-verbal communication indication.

Figure 3:
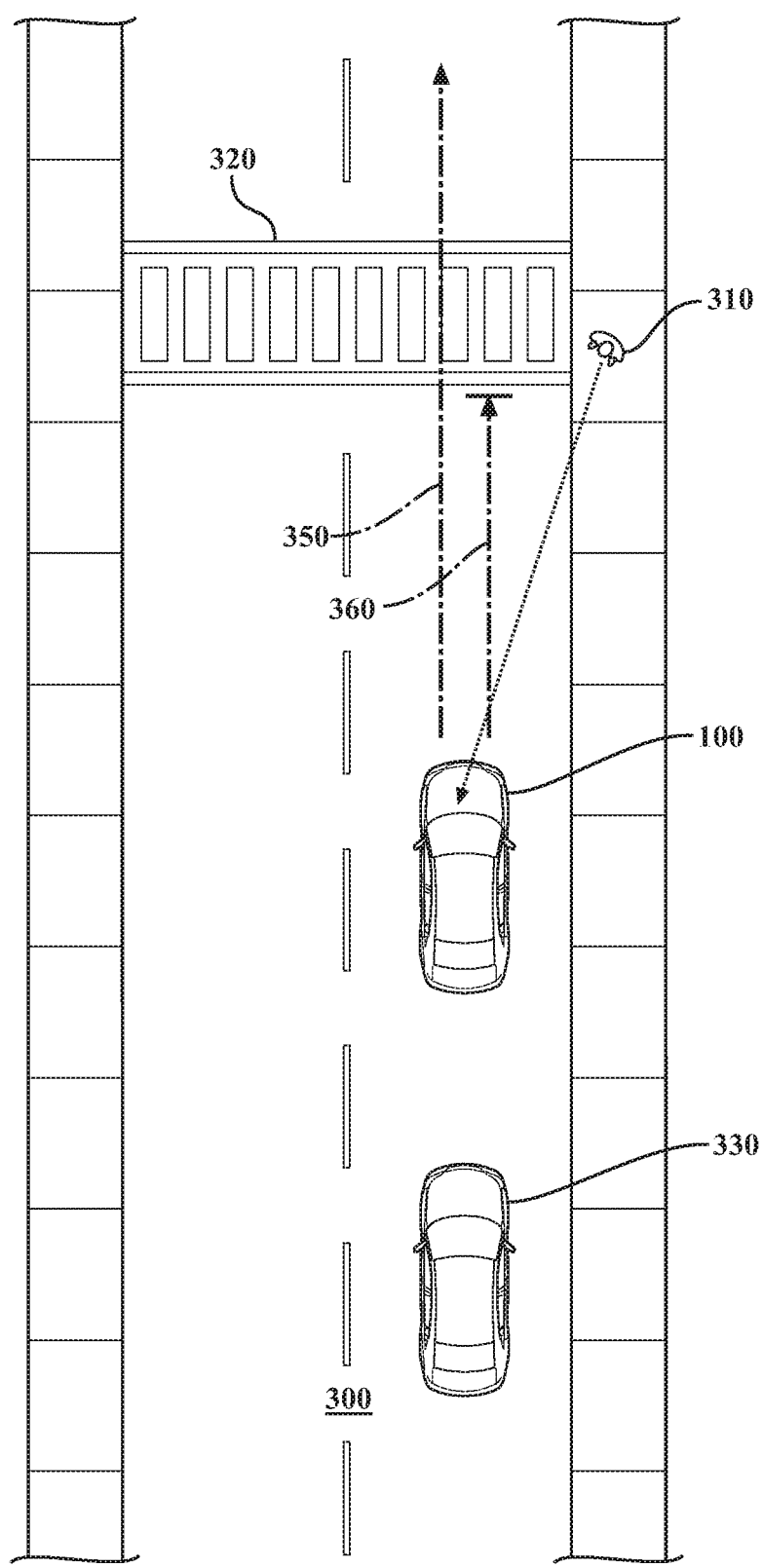
FIG. 3 illustrates an example communication encounter which may be addressed by a communication consistency system according to the disclosed embodiments.

FIG. 3 shows an example communication encounter 300 in which an inconsistency between a communication indication from an occupant and a trajectory plan of an autonomously operated vehicle may be addressed by a communication consistency system 170 according to the disclosed embodiments. A pedestrian 310 is approaching a crosswalk 320 as the vehicle 100, operating in autonomous mode, also approaches the crosswalk 320. Before crossing the crosswalk 320 the pedestrian 310 pauses momentarily and turns toward the vehicle 100 searching for a cue as to how to negotiate the encounter. That is, although the pedestrian 310 may have the right-of-way due to the presence of the crosswalk 320, before entering the crosswalk 320 the pedestrian 310 seeks assurance from the driver of the vehicle 100 that the driver will respect the right-of-way.

The occupant (not shown) of the vehicle 100, well aware of the right-of-way of the pedestrian 310, automatically nods toward the pedestrian 310. However, for any number of reasons the autonomous driving module 160 has generated a trajectory plan 350 that calls for the vehicle 100 to proceed through the crosswalk 320 maintaining a current speed without stopping. For example, the autonomous driving module 160 may not be programmed to recognize right-of-way at crosswalks, the autonomous driving module 160 may not detect the crosswalk 320, etc.

The drive module 220 (FIG. 2) obtains the trajectory plan and updates the trajectory plan data 250 to indicate the current forthcoming trajectory of the vehicle 100, which is to maintain the current speed without slowing down. In this case, the nod by the occupant of the vehicle 100 is inconsistent with the trajectory plan 350 of the vehicle 100. The conflict increases a likelihood of the communication encounter 300 ending in an accident.

Figure 4:
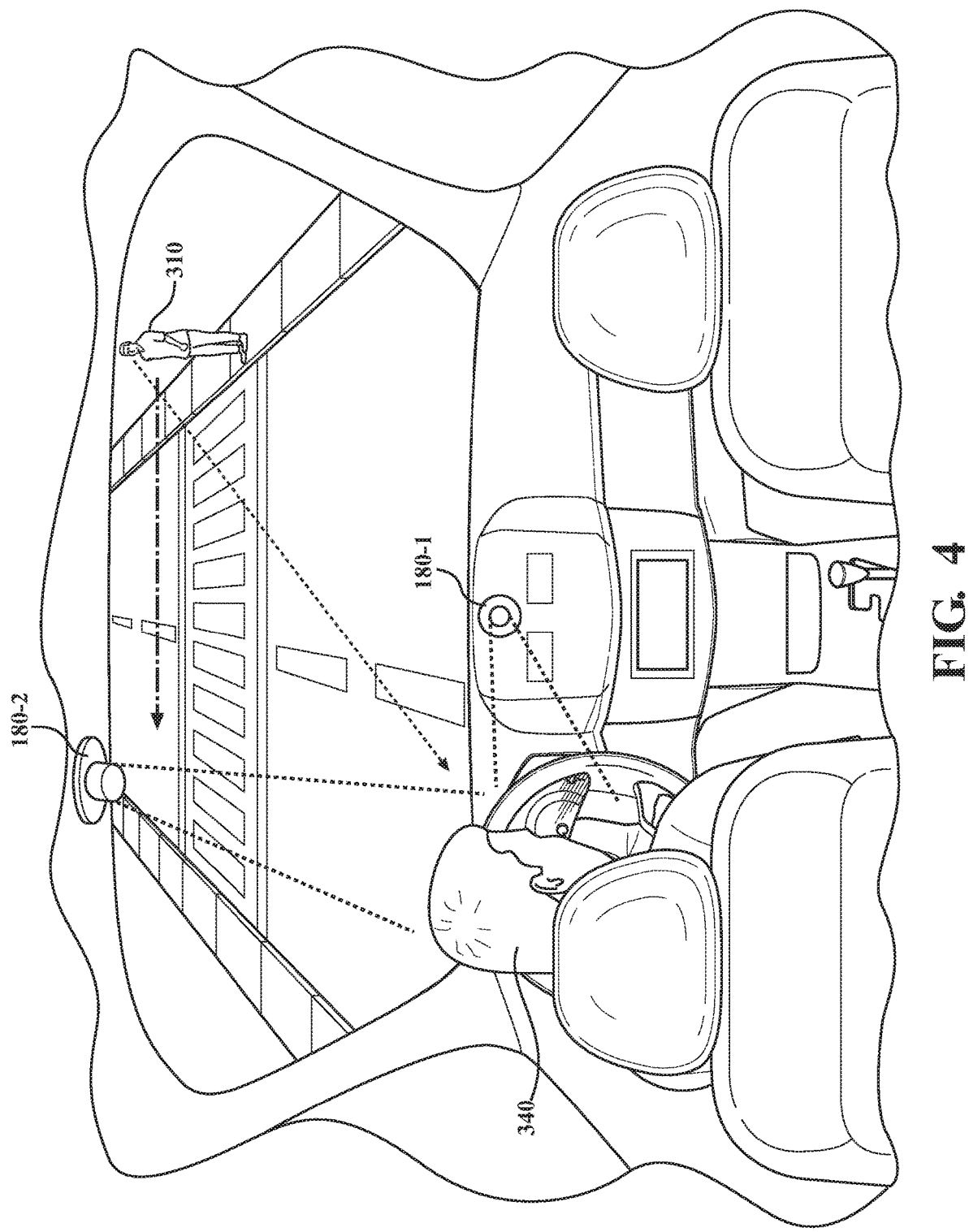
FIG. 4 illustrates another view of the example communication encounter which may be addressed by a communication consistency system according to the disclosed embodiments.

FIG. 4 shows a view of the communication encounter 300 from inside the vehicle 100. Internal sensors 180 monitor the occupant 340 to detect body language of the occupant 340. For example, in one or more embodiments a first sensor 180-1 is configured to detect body motions and gestures while a second sensor 180-2 is configured to track eye movement and detect gaze direction. The internal sensors 180 can be implemented, for example, as cameras, LIDAR or other types of sensors that can detect body movement.

In one or more embodiments, the monitoring module 230 (FIG. 2) can include a machine learning algorithm, such as a trained neural network, configured to analyze data generated by the internal sensors 180 to classify body language and detect when the occupant 340 performs a movement or gesture or otherwise maintains a position that can communicate an intended driving behavior. The monitoring module 230 can also have access to data from one or more environment sensors 122 to detect the presence of a potential communication recipient, such as the pedestrian 310, or a cyclist, other motorist, etc. Thus, the monitoring module 230 can be configured to monitor the occupant 340 and detect, for example, a head motion (e.g., nod or shaking the head), a hand motion (e.g., wave or palm out), a glance in the direction of a potential communication recipient (e.g., pedestrian 310), a gaze directed away from a potential communication recipient, or other types motions, movements, positions or gestures that may be interpreted as a communication of intended vehicle behavior. Based at least in part on the detection, the monitoring module 230 can determine a verbal or non-verbal communication indication from the occupant 340.

Returning to FIG. 4, as the vehicle 100 approaches the communication encounter 300 the monitoring module 230 analyzes sensor data from internal sensors 180 and detects that the occupant 340 has nodded toward the pedestrian 310. The monitoring module 230 determines that this body language is a non-verbal communication indication that equates to "go ahead", which is an indication of an intended vehicle behavior of yielding.

The controller module 240 compares the non-verbal communication indication detected by the monitoring module 230 against the trajectory plan data 250 reflecting the current forthcoming trajectory of the vehicle 100. The controller module 240 determines that the non-verbal communication indication (e.g., yield) and the trajectory plan data 250 (e.g., maintain current speed) are inconsistent. To resolve the potentially dangerous inconsistency the controller module 240 analyzes one or more factors to determine whether to: 1) modify the trajectory plan 350 to form a modified trajectory plan 360 that matches the non-verbal communication indication, or 2) transmit a notification to the occupant 340 prompting the occupant 340 to adjust the non-verbal communication indication.

Referring to FIG. 3, in one or more embodiments the controller module 240 determines whether it is safe to defer to the occupant 340 and change the trajectory plan 350 into a modified trajectory plan 360 that aligns with the non-verbal communication indication. That is, in this example case, the controller module 240 determines whether the vehicle 100 can safely stop prior to reaching the crosswalk 320. The controller module 240 can analyze sensor data from one or more of the environment sensors 122 to estimate a likelihood of an accident occurring based on the sensor data and the modified trajectory plan 360. In one or more embodiments, the controller module 240 determines an "accident potential" that indicates a likelihood of an accident occurring.

For example, the controller module 240 can analyze sensor data from environment sensors 122 and detect one or more other vehicles in the vicinity, including a trailing vehicle 330. The controller module 240 can estimate a stopping time of the vehicle 100 under the modified trajectory plan 360. The controller module 240 can further estimate a likelihood that the trailing vehicle 330 can successfully stop without colliding into the vehicle 100 based, for example, on the current speed of the two vehicles 100, 330, the trailing distance between the two vehicles 100, 330, the distance to the stopping point, weather and road conditions, etc.

In a first example scenario the vehicles 100, 330 may be traveling 25 mph through a neighborhood, the stopping point distance is 200 feet, the trailing vehicle 330 distance is 30 feet and the weather and road conditions are dry. The controller module 240 can weight each of multiple factors such as these and determine a 10% accident potential that the modified trajectory plan 360 will result in a rear-end collision. However, in a second example scenario the vehicles 100, 330 may be traveling 45 mph on a parkway, the stopping point distance is 100 feet, the trailing vehicle 330 distance is 20 feet and the weather and road conditions are rainy. The controller module 240 can again weight each of multiple factors such as these and determine an 80% accident potential that the modified trajectory plan 360 will result in a rear-end collision.

In one or more embodiments, the controller module 240 can determine an approach to resolving the inconsistency between the trajectory plan 350 and the non-verbal communication indication based at least in part on whether the accident potential exceeds a safety threshold. The safety threshold can be predetermined or can vary depending on circumstances and/or upon implementation. For example, in one or more embodiments when the accident potential does not exceed a predetermined threshold of 35% the controller module 240 modifies the trajectory plan 350 and implements the modified trajectory plan 360. That is, for the example first scenario presented above in which the controller module 240 determined a 10% accident potential, the controller 240 would proceed to implement the modified trajectory plan 360 aligned with the non-verbal communication indication detected from the occupant 340 of the vehicle 100, i.e., to slow down and stop before reaching the crosswalk 320 to allow the pedestrian 310 to cross.

However, in the example second scenario in which the controller 240 determined an 80% accident potential, the controller module 240 would not modify the existing trajectory plan 350, since the accident potential exceeds the safety threshold.

In one or more embodiments, when the controller module 240 determines that it is not safe to modify the current trajectory plan 350, the controller module 240 can transmit a notification to the occupant 340 prompting the occupant 340 to adjust the non-verbal communication indication. For example, the notification can warn the occupant 340 that the occupant 340 is currently projecting a communication that conflicts with the current trajectory of the vehicle 100 and advise the occupant 340 to change his/her body language. In one or more embodiments, the notification can identify the subject behavior and suggest a new body language position, for example: "Attention: Your present body language (nodding) conflicts with the current trajectory of the vehicle and this miscommunication may lead to an accident. Please lower your gaze for a few moments."

Furthermore, in one or more embodiments the vehicle 100 may be equipped with one or more external communication devices 190, such as headlights, additional lights, a display panel, an audio device, or other external communication device. In addition to the controller module 240 transmitting a notification to the occupant 340 prompting the occupant 340 to adjust the non-verbal communication indication, the controller module 240 can control the one or more external communication devices 190 to signal a vehicle behavior in accordance with the determined resolution. For example, in one or more embodiments the controller module 240 can cause a head light or secondary light to blink twice, indicating that the vehicle 100 will allow the pedestrian to proceed, or flash a long held light warning that the vehicle 100 is proceeding.

Figure 5:
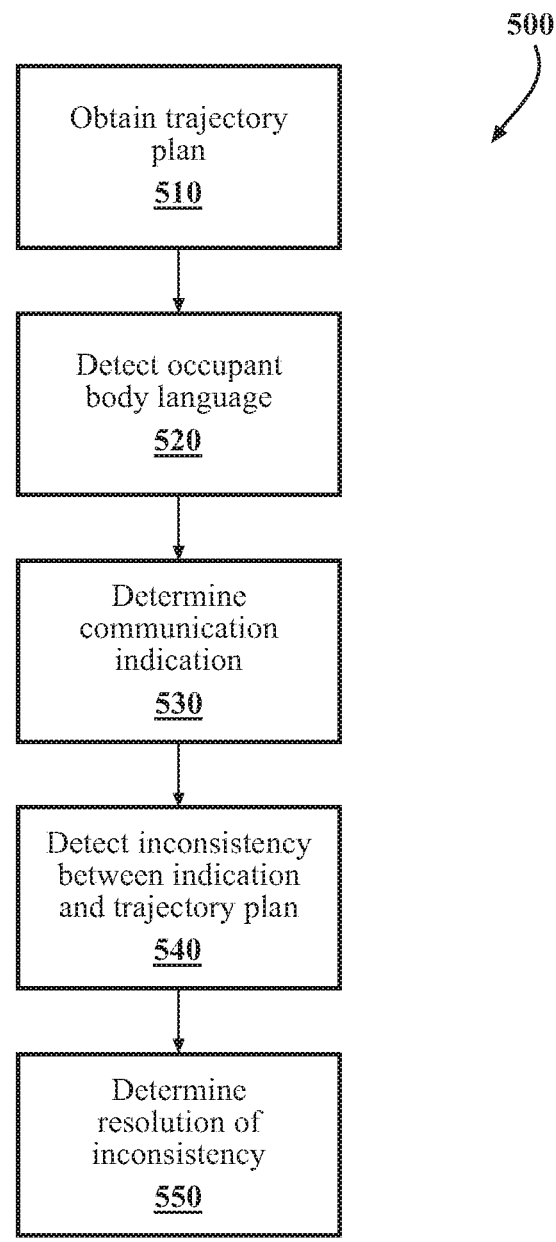
FIG. 5 illustrates a flowchart of a method of resolving inconsistent communication from an occupant of an autonomously operated vehicle according to the disclosed embodiments.

FIG. 5 illustrates a flowchart of a method 500 of resolving inconsistent communication from an occupant of an autonomously operated vehicle according to the disclosed embodiments. Method 500 will be discussed from the perspective of the communication consistency system 170 of FIGS. 1 and 2. While method 500 is discussed in combination with the communication consistency system 170, it should be appreciated that the method 500 is also not limited to being implemented within the communication consistency system 170 but is instead one example of a system that may implement the method 500.

At operation 510, the communication consistency system 170, e.g., the drive module 220, obtains a trajectory plan for the vehicle 100. For example, the drive module 220 can retrieve the trajectory plan from one or more other systems in the vehicle 100, such as navigation system 147, steering system 143, or autonomous driving module 160. In one or more embodiments the drive module 220 can compile, store and update trajectory plan data 250 that continually reflects the most recent trajectory plan of the vehicle 100.

At operation 520, the communication consistency system 170 detects, e.g., via one or more internal sensors 180, movement, position, or body language of an occupant of the vehicle 100. In one or more embodiments the occupant may be seated in a driver's seat of the vehicle 100, or in another seat of the vehicle 100.

At operation 530, the communication consistency system 170, e.g., the monitoring module 230, analyzes sensor data from the one or more internal sensors 180 to determine a communication indication by the occupant of the vehicle 100. For example, the monitoring module 230 can include a machine learning algorithm trained to identify and classify various gestures, poses, body positions or the like into communication indications. In one or more embodiments the communication indication is a non-verbal communication indication.

At operation 540, the communication consistency system 170, e.g., the controller module 240, detects an inconsistency between the communication indication and the trajectory plan. For example, the controller module 240 can determine that the communication indication implies that the vehicle 100 will be momentarily stopping while, in contrast, the current trajectory plan calls for the vehicle 100 to proceed at current speed without stopping.

At operation 550 the controller module 240 determines a resolution to the inconsistency, for example, by executing either of: 1) modify the trajectory plan to form a modified trajectory plan that is aligned with the communication indication, or 2) transmit a notification to the occupant prompting the occupant to adjust the non-verbal communication indication.

Figure 6:
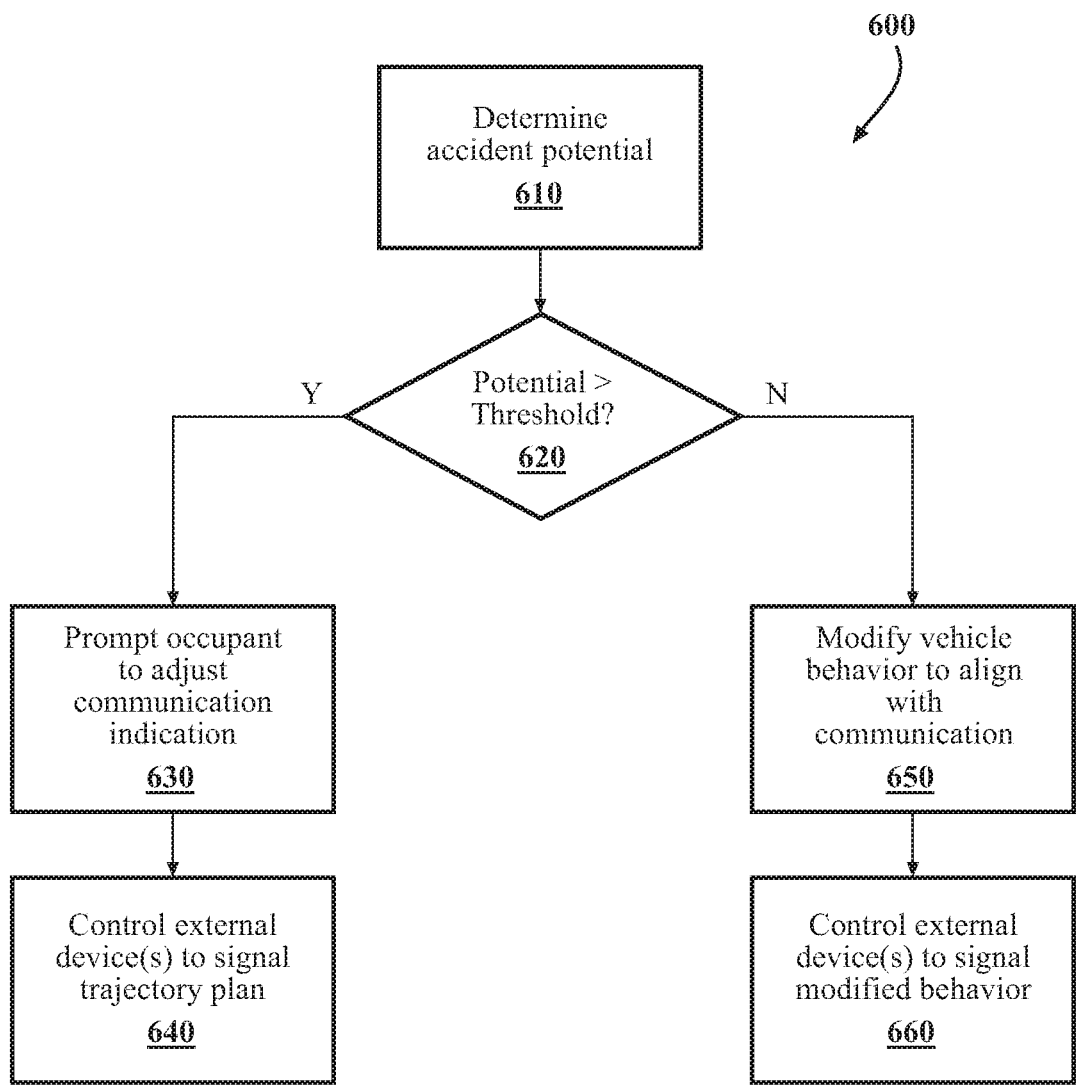
FIG. 6 illustrates a flow chart of a method of a controller module resolving an inconsistency according to the disclosed embodiments.

FIG. 6 illustrates a flowchart of a method 600 of the controller module 240 resolving an inconsistency between a current trajectory plan and a communication indication from an occupant of the vehicle 100. At operation 610, the controller module 240 determines an accident potential based on an analysis of sensor data from the one or more environment sensors 122 and the modified trajectory plan. The accident potential indicates a likelihood of the modified trajectory plan resulting in an accident occurring. In one or more embodiments, the controller module 240 can determine the accident potential by running one or more simulations simulating execution of the modified trajectory plan, calculate the accident potential based on a formulaic weighting of various factors, or use another technique to estimate a probability of the modified trajectory plan resulting in an accident occurring.

At operation 620, the controller module 240 determines whether the accident potential exceeds a safety threshold. For example, in one or more embodiments the controller module 240 compares the accident potential to a predetermined threshold or a calculated threshold to determine whether the accident potential exceeds the threshold.

At operation 630, when the accident potential exceeds the threshold, i.e., indicating a significant likelihood of the modified trajectory plan resulting in an accident, the controller module 240 does not implement the modified trajectory plan but instead allows the current trajectory plan to continue and prompts the occupant to adjust his/her communication indication. For example, the controller module 240 can notify the occupant of the body language or posture that is inconsistent with the current trajectory plan and suggest body language or a posture that is neutral or that is aligned with the current trajectory plan.

At operation 640, the controller module 240 can optionally control one or more external devices to signal the current trajectory plan. For example, in one or more embodiments the one or more external devices can include secondary lights or a display panel that the controller module 240 can operate to flash in a manner that indicates the trajectory plan, e.g., two quick blinks to signal to a third party that the vehicle 100 is yielding, a held light to indicate the vehicle 100 is proceeding, an explicit message such as "Vehicle Proceeding" or "Vehicle Yielding" on the display panel, etc.

At operation 650, when the accident potential does not exceed the threshold, i.e., indicating no significant likelihood of the modified trajectory plan resulting in an accident, the controller module 240 modifies the current trajectory plan to implement the modified trajectory plan, thereby aligning the behavior of the vehicle 100 with the communication indication. For example, when a current trajectory plan would have caused the vehicle 100 to proceed through a crosswalk area without stopping, instead the controller module 240 can modify the trajectory plan to align with a communication indication (e.g., a courtesy nod) from the occupant of the vehicle 100 and stop prior to reaching the crosswalk area.

At operation 660, the controller module 240 can optionally control one or more external devices to signal vehicle behavior in accordance with the modified trajectory plan.

Accordingly, the disclosed communication consistency system 170 can improve the safety operation of a vehicle 100 in an autonomous operation mode resolving conflicts between a trajectory plan of the vehicle 100 and an apparent (explicit or implicit) communication indication by an occupant of the vehicle 100. Such conflicts can lead to confusion and quickly escalate into accidents, however, the disclosed communication consistency system 170 can effectively detect and defuse potentially dangerous close encounter situations by bringing about alignment between the communication indication and the trajectory of the vehicle 100, thereby replacing confusion with clarity.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in either an autonomous mode or a manual mode.

In one or more embodiments, the vehicle 100 is an autonomous vehicle. As used herein, "autonomous vehicle" refers to a vehicle that operates and executes various driving functions autonomously. More specifically, "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, pedestrians, bicyclists, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the communication consistency system 170 can be configured to determine trajectory plans and travel path(s), and determine current autonomous driving maneuvers for the vehicle 100, future autonomous driving maneuvers and/or modifications to current autonomous driving maneuvers based on data acquired by the sensor system 120 and/or communication consistency system 170, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

The processor(s) 110, the communication consistency system 170, and/or the autonomous driving module(s) 160 can be operatively connected to communicate with the various vehicle systems 140 and/or individual components thereof. For example, returning to FIG. 1, the processor(s) 110, the communication consistency system 170, and/or the autonomous driving module(s) 160 can be in communication to send and/or receive information from the various vehicle systems 140 to determine/set a trajectory plan and/or control the movement, speed, maneuvering, heading, direction, etc. of the vehicle 100. The processor(s) 110, the communication consistency system 170, and/or the autonomous driving module(s) 160 may control some or all of these vehicle systems 140 and, thus, may be partially or fully autonomous.

The processor(s) 110, the communication consistency system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the communication consistency system 170, and/or the autonomous driving module(s) 160 can control the direction and/or speed of the vehicle 100, e.g., to move toward an optimal alignment position. The processor(s) 110, the communication consistency system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110, the communication consistency system 170, and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A communication consistency system for an autonomously operated vehicle, comprising:
one or more internal sensors configured to detect body language of an occupant of the vehicle;
one or more environment sensors configured to detect one or more aspects of an environment outside of the vehicle;
one or more processors; and
a memory communicably coupled to the one or more processors and storing:
a drive module including instructions that when executed by the one or more processors cause the one or more processors to obtain a trajectory plan for the vehicle;
a monitoring module including instructions that when executed by the one or more processors cause the one or more processors to analyze sensor data from the one or more internal sensors to determine a verbal or non-verbal communication indication by the occupant; and
a controller module including instructions that when executed by the one or more processors cause the one or more processors to:
detect an inconsistency between the verbal or non-verbal communication indication and the trajectory plan and:
1) modify the trajectory plan to form a modified trajectory plan aligned with the verbal or non-verbal communication indication, or
2) transmit a notification to the occupant prompting the occupant to adjust the verbal or non-verbal communication indication;
determine an accident potential based on an analysis of sensor data from the one or more environment sensors and the modified trajectory plan, the accident potential indicating a likelihood of the modified trajectory plan resulting in an accident occurring; and
transmit a notification to the occupant of the vehicle prompting the occupant to adjust the verbal or non-verbal communication indication upon a determination that the modified trajectory plan results in the accident potential exceeding a threshold value.

2. The communication consistency system of claim 1, wherein the one or more aspects of the environment outside of the vehicle include one or more of:
trajectory of one or more other vehicles,
trajectory of one or more pedestrians,
position of one or more stationary objects,
weather conditions,
road conditions, or
lighting conditions.

3. The communication consistency system of claim 1, further comprising:
one or more external communication devices,
wherein the controller module further includes instructions to control the one or more external communication devices to indicate a vehicle behavior in accordance with the trajectory plan when the trajectory plan is not modified.

4. The communication consistency system of claim 1, further comprising:
one or more external communication devices,
wherein the controller module further includes instructions to control the one or more external communication devices to indicate a vehicle behavior in accordance with the modified trajectory plan when the trajectory plan is modified.

5. The communication consistency system of claim 4, wherein the one or more external communication devices include one or more of:
headlights,
one or more secondary lights,
a display panel, or
an audio device.

6. The communication consistency system of claim 1, wherein the instructions to determine the verbal or non-verbal communication indication comprise instructions to determine the verbal or non-verbal communication indication based on one or more of:
an eye gaze direction of the occupant,
a head motion of the occupant, or
a hand gesture of the occupant.

7. The communication consistency system of claim 1, wherein the controller module further includes instructions to modify, upon a determination that the modified trajectory plan results in the accident potential being within the threshold value, the current trajectory plan to implement the modified trajectory plan.

8. A method of resolving inconsistent communication from an occupant of an autonomously operated vehicle, comprising:
   obtaining a trajectory plan for the vehicle;
   detecting, using one or more internal sensors, body language of the occupant of the vehicle;
   analyzing sensor data from the one or more internal sensors to determine a verbal or non-verbal communication indication by the occupant;
   detecting an inconsistency between the verbal or non-verbal communication indication and the trajectory plan and:
      1) modifying the trajectory plan to form a modified trajectory plan aligned with the verbal or non-verbal communication indication, or
      2) transmitting a notification to the occupant prompting the occupant to adjust the verbal or non-verbal communication indication;
   detecting, using one or more environment sensors, one or more aspects of an environment outside of the vehicle;
   determining an accident potential based on an analysis of sensor data from the one or more environment sensors and the modified trajectory plan, the accident potential indicating a likelihood of the modified trajectory plan resulting in an accident occurring; and
   transmitting a notification to the occupant of the vehicle prompting the occupant to adjust the verbal or non-verbal communication indication when the modified trajectory plan results in the accident potential exceeding a threshold value.

9. The method of claim 8, wherein the one or more aspects of the environment outside of the autonomous vehicle include one or more of:
   trajectory of one or more other vehicles,
   trajectory of one or more pedestrians,
   position of one or more stationary objects,
   weather conditions,
   road conditions, or
   lighting conditions.

10. The method of claim 8, further comprising controlling one or more external communication devices to indicate a vehicle behavior in accordance with the trajectory plan when the trajectory plan is not modified.

11. The method of claim 10, wherein the one or more external communication devices include one or more of:
   headlights,
   one or more secondary lights,
   a display panel, or
   an audio device.

12. The method of claim 8, further comprising controlling one or more external communication devices to indicate a vehicle behavior in accordance with the modified trajectory plan when the trajectory plan is modified.

13. The method of claim 8, wherein the verbal or non-verbal communication indication is based on one or more of:
   an eye gaze direction of the occupant,
   a head motion of the occupant, or
   a hand gesture of the occupant.

14. The method of claim 8, further comprising modifying, when the modified trajectory plan results in the accident potential being within the threshold value, the current trajectory plan to implement the modified trajectory plan.

15. A non-transitory computer-readable medium for resolving inconsistent communication from an occupant of an autonomously operated vehicle, including instructions that, when executed by one or more processors, cause the one or more processors to:
   obtain a trajectory plan for the vehicle;
   detect, using one or more internal sensors, body language of the occupant the vehicle;
   analyze sensor data from the one or more internal sensors to determine a verbal or non-verbal communication indication by the occupant;
   detect an inconsistency between the verbal or non-verbal communication indication and the trajectory plan and:
      1) modify the trajectory plan to form a modified trajectory plan aligned with the verbal or non-verbal communication indication, or
      2) transmit a notification to the occupant prompting the occupant to adjust the verbal or non-verbal communication indication;
   detect, using one or more environment sensors, one or more aspects of an environment outside of the vehicle;
   determine an accident potential based on an analysis of sensor data from the one or more environment sensors and the modified trajectory plan, the accident potential indicating a likelihood of the modified trajectory plan resulting in an accident occurring; and
   transmit a notification to the occupant of the vehicle prompting the occupant to adjust the verbal or non-verbal communication indication when the modified trajectory plan results in the accident potential exceeding a threshold value.

16. The non-transitory computer-readable of claim 15, wherein the one or more aspects of the environment outside of the autonomous vehicle include one or more of:
   trajectory of one or more other vehicles,
   trajectory of one or more pedestrians,
   position of one or more stationary objects,
   weather conditions,
   road conditions, or
   lighting conditions.

17. The non-transitory computer-readable of claim 15, further comprising instructions to control one or more external communication devices to indicate a vehicle behavior in accordance with the trajectory plan when the trajectory plan is not modified.

18. The non-transitory computer-readable of claim 15, further comprising instructions to control one or more external communication devices to indicate a vehicle behavior in accordance with the modified trajectory plan when the trajectory plan is modified.

19. The non-transitory computer-readable of claim 18, wherein the verbal or non-verbal communication indication is based on one or more of:
   an eye gaze direction of the occupant,
   a head motion of the occupant, or
   a hand gesture of the occupant.

20. The non-transitory computer-readable of claim 15, further comprising instructions to modify, when the modified trajectory plan results in the accident potential being within the threshold value, the current trajectory plan to implement the modified trajectory plan.

* * * * *